United States Patent
Ikeda et al.

(10) Patent No.: US 7,068,157 B2
(45) Date of Patent: Jun. 27, 2006

(54) TIRE INFORMATION DETECTING SYSTEM

(75) Inventors: Koji Ikeda, Miyagi-ken (JP); Naobumi Ota, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 89 days.

(21) Appl. No.: 10/818,199

(22) Filed: Apr. 5, 2004

(65) Prior Publication Data

US 2004/0201466 A1  Oct. 14, 2004

(30) Foreign Application Priority Data

Apr. 10, 2003  (JP)  ............................. 2003-106768

(51) Int. Cl.
*B60C 23/00*  (2006.01)
(52) U.S. Cl. ..................... 340/442; 340/447; 73/146.5
(58) Field of Classification Search ............... 340/442, 340/445, 447; 73/146.5, 146.2, 146.4
See application file for complete search history.

(56) References Cited

U.S. PATENT DOCUMENTS

| | | | | |
|---|---|---|---|---|
| 5,263,524 A | * | 11/1993 | Boardman | .................. 152/416 |
| 6,034,597 A | | 3/2000 | Normann | .................... 340/447 |
| 6,169,480 B1 | * | 1/2001 | Uhl et al. | .................... 340/442 |
| 6,194,999 B1 | * | 2/2001 | Uhl et al. | .................... 340/447 |
| 6,304,172 B1 | | 10/2001 | Katou et al. | ................. 340/445 |

FOREIGN PATENT DOCUMENTS

JP  08-219920  8/1996

* cited by examiner

*Primary Examiner*—Phung T. Nguyen
(74) *Attorney, Agent, or Firm*—Brinks Hofer Gilson & Lione

(57) ABSTRACT

A tire information detecting system includes a plurality of tire information output units that sense and output tire information corresponding to respective tires at predetermined intervals and a tire information detecting unit that detects tire conditions based on the tire information transmitted from the tire information output units while a vehicle is being driven. Every time the tire information detecting unit normally completes processing of one of the tire information signals, the tire information detecting unit changes priority in the tire information so as to assign the lowest priority to the processed tire information signal. When the plurality of tire information output units transmit a plurality of the tire information signals while the tire information detecting unit is ready for reception, the tire information detecting unit processes one of the tire information signals having a higher priority and discards processes of the other tire information signals.

7 Claims, 5 Drawing Sheets

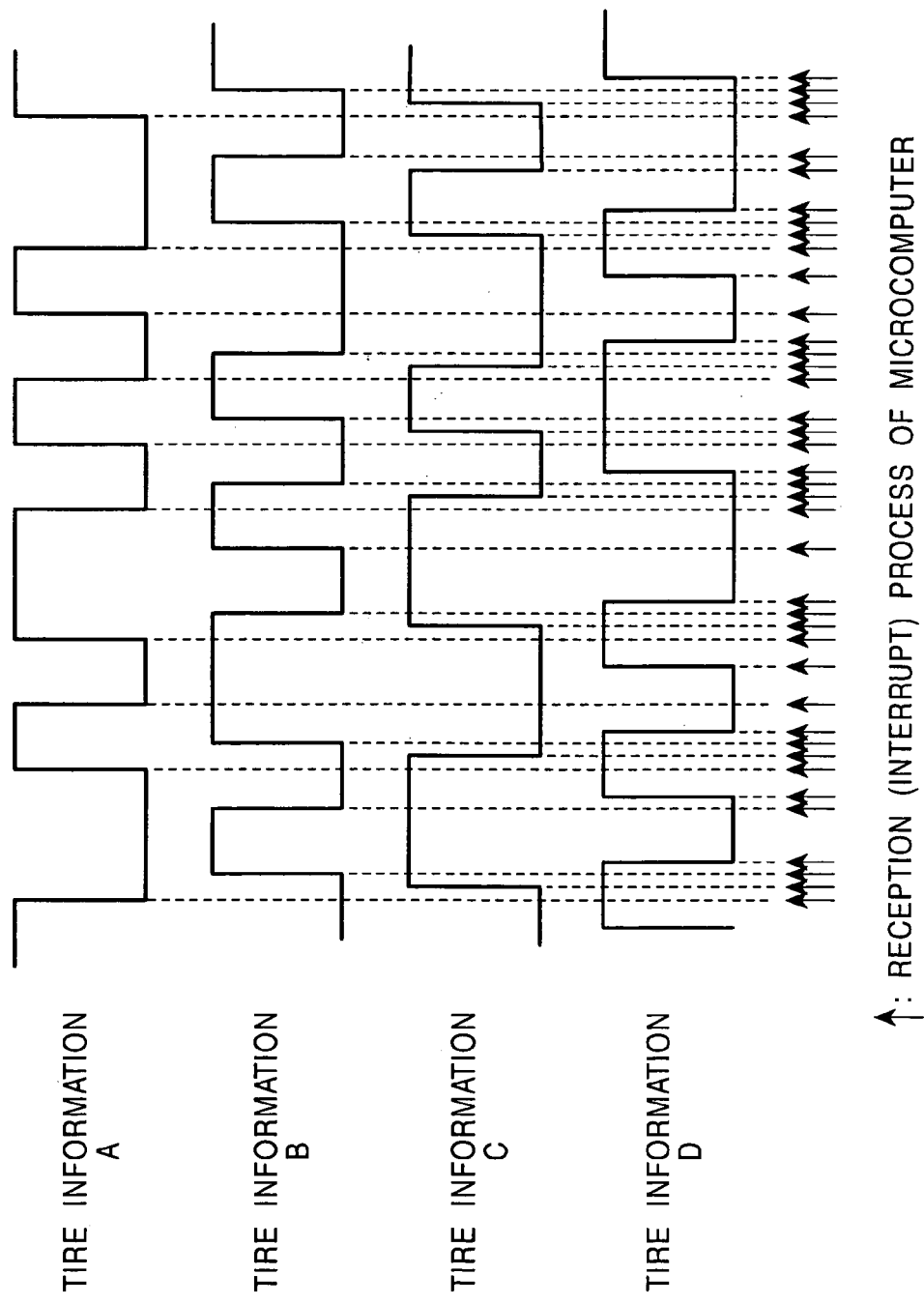

TIRE INFORMATION DETECTING SYSTEM

This application claims the benefit of priority to Japanese Patent Application No. 2003-106768, herein incorporated by reference.

BACKGROUND OF THE INVENTION

1. Field of the Invention

The present invention relates to a tire information detecting system for detecting tire information, including tire pressure, and, in particular, to cost-reducing means of the tire information detecting system by down-grading a tire information detecting unit composed of a microcomputer.

2. Description of the Related Art

A tire pressure monitoring system, which includes output means (tire information output unit) that outputs signals (tire information) including vibration frequency components of tires and detecting means (tire information detector) that retrieves resonance frequencies from the signal and then detects the tire pressures based on the resonance frequencies while a vehicle is being driven, has been proposed, as is disclosed in Japanese Unexamined Patent Application Publication No. 8-219920.

The output means is disposed in each tire of the vehicle and outputs sensed signals (tire information) including vibration frequency components of the tire to the detecting means composed of a wave shaping circuit, a ROM, and a RAM. The detecting means retrieves the resonance frequency of the tire from the signal including tire vibration frequency components and then detects the tire pressure based on the fact that, in normal vehicle use, a change in the resonance frequency is mostly generated by a change in a tire spring constant caused by a change in the tire pressure.

Consequently, according to the tire pressure monitoring system, an alarm that the tire pressures are below the allowed lower limit or the values of the tire pressures themselves can be displayed on a display unit of the vehicle so that a driver of the vehicle can check if the tire pressures are normal by monitoring the display. Therefore, driving safety of the vehicle can be increased.

Since a vehicle has four and more tires and output timings of signals from the output means, each mounted in each tire, are not synchronized, with reference to FIG. 7, a plurality of signals, four signals in FIG. 7, from the output means are sometimes input to the detecting means substantially at the same time.

Detecting means of such known tire pressure monitoring systems do not have a function that timely controls the reception processes of the signals in accordance with the output timing of the output means. Thus, the detecting means must process all the signals output from the output means. Consequently, the number of the reception processes performed in the detecting means is increased. In addition, as shown in FIG. 7, if signals from a plurality of the output means are input substantially at the same time, time intervals between the reception processes performed in the detecting means become shorter. Accordingly, the detecting means must include a high-performance microcomputer providing a high throughput and therefore the tire pressure monitoring system is disadvantageously costly.

SUMMARY OF THE INVENTION

Accordingly, it is an object of the present invention to provide a tire information detecting system that reliably detects tire information, such as tire pressure, by using a low-performance and low-cost microcomputer.

A tire information detecting system according to the present invention includes a plurality of tire information output units, each separately detecting and outputting a tire information signal corresponding to each of a plurality of tires attached to axels, and a tire information detecting unit for detecting tire conditions of the tires based on the tire information transmitted from the tire information output units. Every time the tire information detecting unit completes a reception process of one of the tire information signals, the tire information detecting unit changes priority in the tire information so as to assign the lowest priority to the processed tire information signal. When the plurality of tire information output units transmit a plurality of the tire information signals while the tire information detecting unit is ready for reception, the tire information detecting unit processes one of the tire information signals having the highest priority and discards processes of the other tire information signals having lower priorities.

Thus, when the plurality of tire information output units transmit the plurality of tire information signals while the tire information detecting unit is ready for reception, one of the tire information signals having higher priority is processed and the other tire information signals are discarded. Consequently, the number of reception processes performed in the tire information detecting unit can be reduced and therefore intervals between the reception processes can be increased. As a result, the load of the tire information detecting unit, which is composed of a microcomputer, can be reduced and therefore a low-cost, low-performance microcomputer can be used for the tire information detecting unit. This reduces the total cost of the tire information detecting system.

In the tire information detecting system according to the present invention, each of the tire information output units includes a sensor for sensing the tire information and a radio transmitter for wirelessly transmitting the tire information sensed by the sensor to the tire information detecting unit, and the tire information detecting unit includes radio receivers for receiving and reshaping the tire information signals wirelessly transmitted from the radio transmitters and a computing unit for controlling the overall tire information detecting system and for detecting conditions of the tires.

Thus, since the tire information output units have respective radio transmitters and wirelessly transmit tire information to the tire information detecting unit, wires between the tire information output units and the tire information detecting unit are not required. Accordingly, the tire information detecting system can be easily assembled into the vehicle body. In addition, breaking of wires during use does not occur, thus enhancing durability and reliability of the tire information detecting system.

In the tire information detecting system according to the present invention, when the plurality of tire information output units transmit a plurality of the tire information signals while the tire information detecting unit is ready for reception, the tire information detecting unit discards reception processes of the other tire information signals by inhibiting external interrupts of the other tire information signals having lower priorities to the computing unit.

Since the reception processes for tire information having lower priorities are discarded by inhibiting an external interrupt of tire information signals to the tire information detecting unit, a program stored in the tire information detecting unit can execute reception processes of the tire information, and can inhibit external interrupts. Accordingly, desired processes can be performed in a short time and reliability of the tire information detecting system is increased.

In the tire information detecting system according to the present invention, when the plurality of tire information output units transmit a plurality of the tire information signals while the tire information detecting unit is ready for reception, the tire information detecting unit discards reception processes of the other tire information signals by shutting off electric power for the radio receivers for receiving the tire information signals having lower priorities.

Since the reception processes for tire information having lower priorities are discarded by shutting off the electric power for particular radio receivers, transmission of the tire information having lower priorities from tire information output units to the tire information detecting unit can be temporarily stopped. Consequently, the number of reception processes performed in the tire information detecting unit can be reduced and therefore the load of the tire information detecting unit can be reduced. As a result, the total cost of the tire information detecting system can be further reduced.

In the tire information detecting system according to the present invention, when the tire information detecting unit receives a plurality of the tire information signals while the tire information detecting unit is ready for reception, the tire information detecting unit assigns a higher priority to one of the tire information signals having a longer elapsed time after the previous normal process of the tire information signal.

Since the priorities of tire information are determined by assigning a higher priority to one of the tire information signals having a longer time period after the previous normal process of the tire information signal, the reception processes for the tire information signals are performed evenly. As a result, the tire information detecting system can reliably detect the tire information.

In the tire information detecting system according to the present invention, the information detecting unit does not assign priorities to the tire information signals at system startup time and assigns the priorities after processing one of the tire information signals normally.

As described above, since signals output from the tire information output units are not synchronized at all, the timing of signals output from the tire information output units are normally different at the system startup time, and therefore a plurality of the tire information signals are not virtually received by the tire information detecting unit. Accordingly, the tire information detecting unit need not set priorities to the tire information during the whole time period from system startup to system shutdown. After startup, the tire information detecting unit may assign priorities to the pieces of tire information after it normally performs a reception process for one of the tire information signals.

In the tire information detecting system according to the present invention, the information detecting unit monitors RSSI levels output from the radio receivers and performs the reception processes of the signals output from the radio receivers as the tire information after the RSSI levels exceed a predetermined threshold value.

Although the radio receivers in the tire information detecting unit do not receive any signals from the tire information output units, some wave signals are sometimes output from the radio receivers to the computing unit. These wave signals are not tire information transmitted from the tire information output units wirelessly. If the computing unit performs reception processes for these wave signals, the load of the computing unit increases, thereby impairing the normal reception processes of the tire information. To solve this problem, the RSSIs output from the radio receivers are utilized when signals are received from the tire information output units. Only wave signals delivered from the radio receivers are processed as tire information after the levels of RSSIs exceed a predetermined threshold value. This prevents reception processes for incorrect signals, thus performing reception processes only for the tire information and reducing the load of the computing unit.

BRIEF DESCRIPTION OF THE DRAWINGS

FIG. 7 is a diagram for explaining a disadvantage of a known tire information detecting system.

DESCRIPTION OF THE PREFERRED EMBODIMENTS

Figure 1:
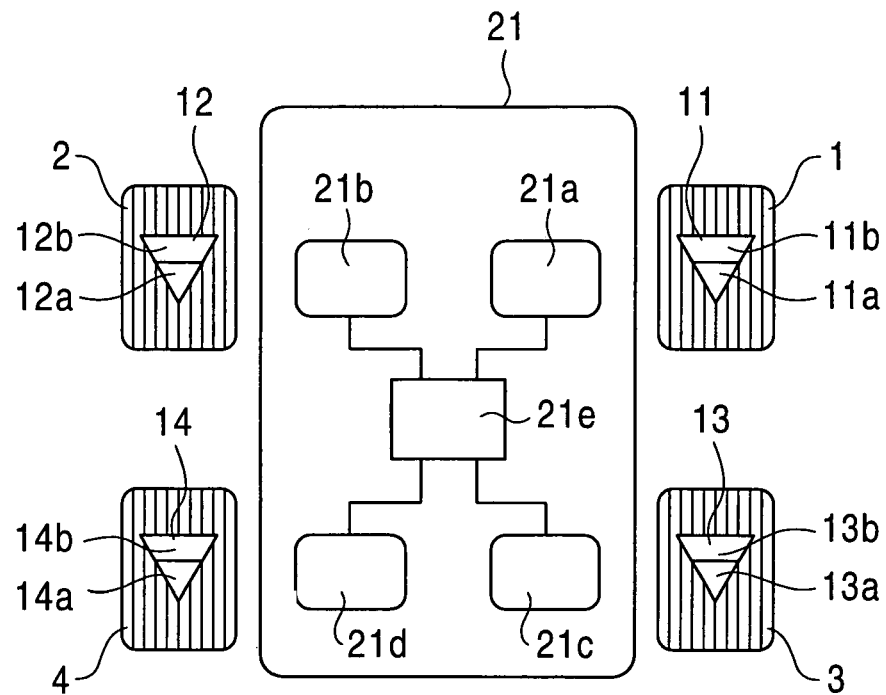
FIG. 1 shows a configuration of a tire information detecting system according to an embodiment.
Figure 2:
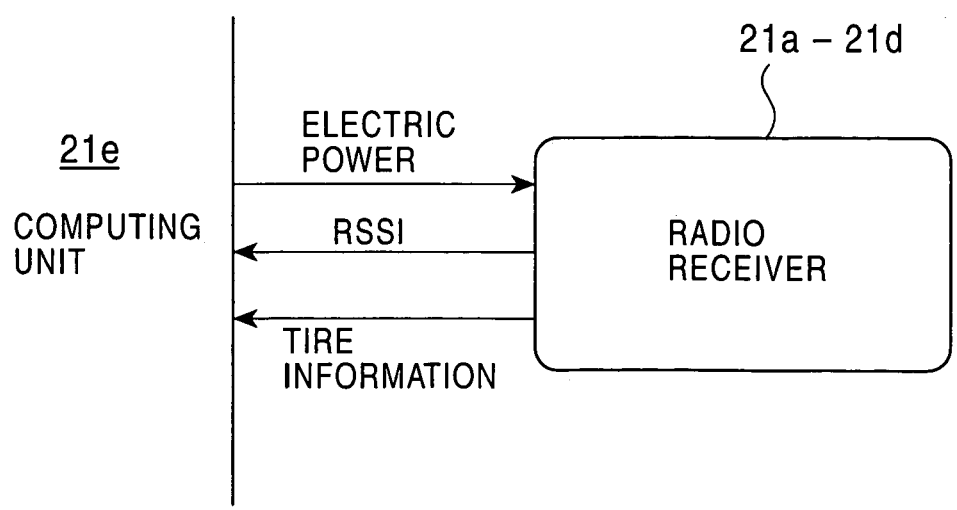
FIG. 2 is a diagram for explaining flows of electric power and signals between a radio receiver and a control unit.
Figure 3:
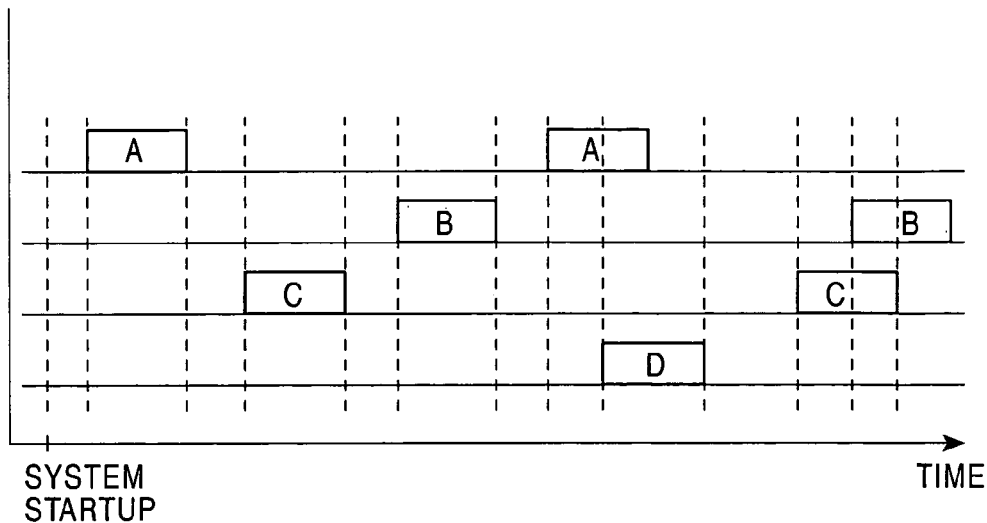
FIG. 3 is an example of transmission timings of tire information signals from the radio receiver to the control unit.
Figure 4:
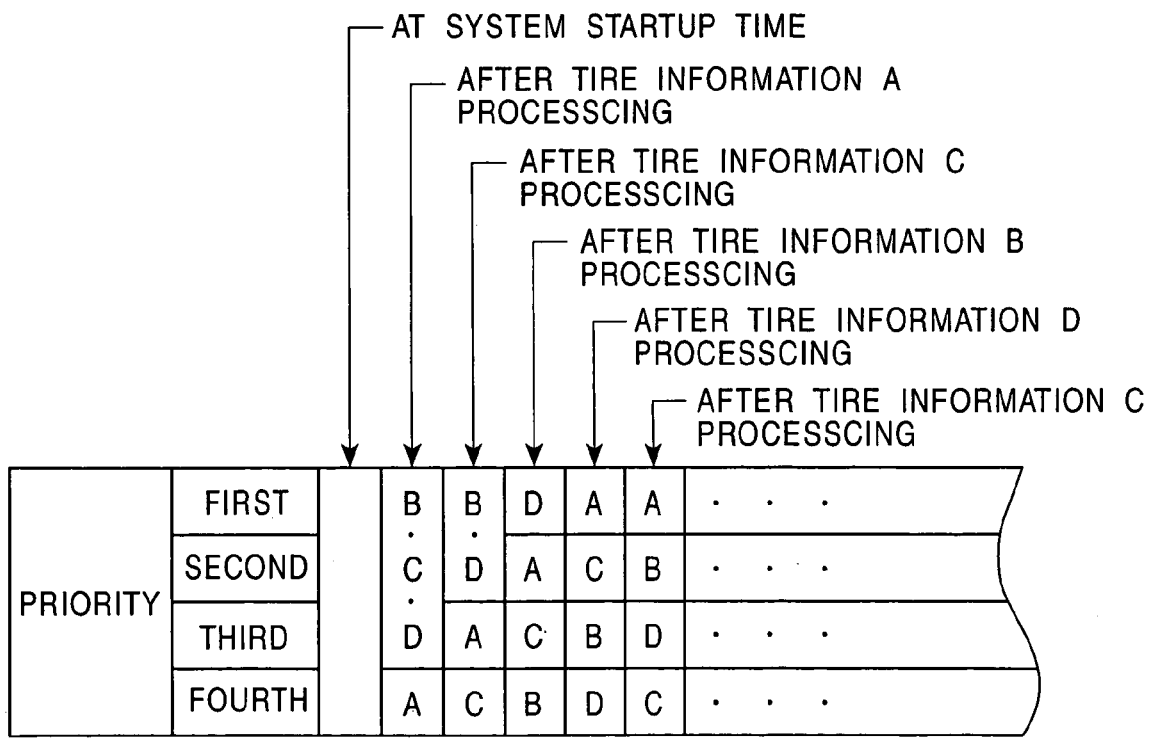
FIG. 4 is a diagram for explaining a transition of priorities of the tire information signals when they are transmitted with the timings shown in FIG. 3.
Figure 5:
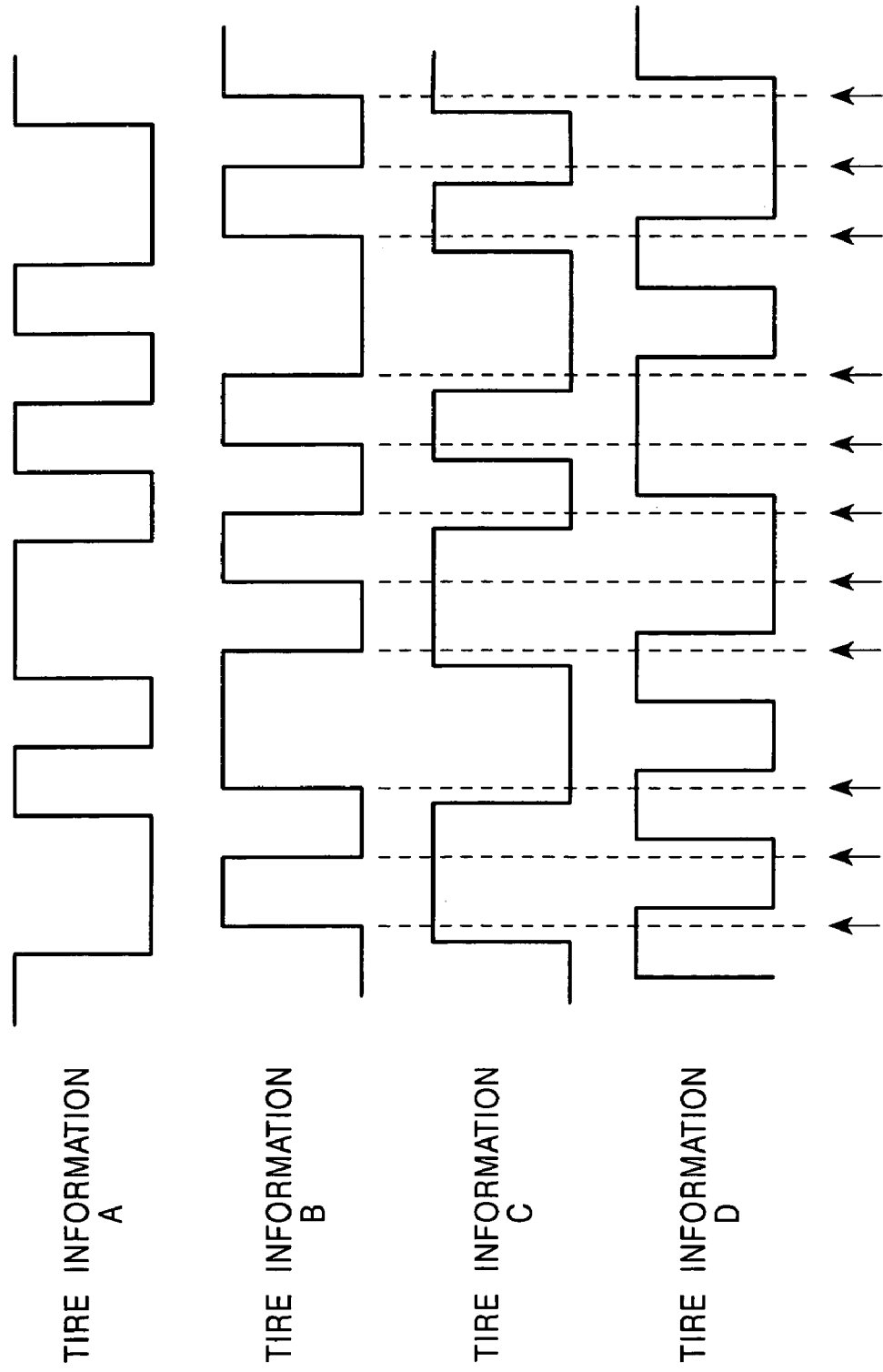
FIG. 5 is a diagram for explaining an advantage of the tire information detecting system according to the embodiment.

Embodiments of a tire information detecting system according to the present invention will now be described with reference to FIGS. 1 to 5. FIG. 1 is a diagram of a structure of the tire information detecting system according to an embodiment. FIG. 2 is a diagram for explaining flows of electric power and signals between a radio receiver and a control unit. FIG. 3 is an example of transmission timing of tire information signals from the radio receiver to the control unit. FIG. 4 is a diagram for explaining transition in priority of the tire information signals when they are transmitted with the timings shown in FIG. 3. FIG. 5 is a diagram for explaining the advantage of the tire information detecting system according to the embodiment.

With reference to FIG. 1, a tire information detecting system according to an embodiment includes four tire information output units 11, 12, 13, and 14 corresponding to four tires 1, 2, 3, and 4, respectively, and a tire information detecting unit 21. The tire information detecting unit 21 receives tire information from the tire information output units 11, 12, 13, and 14, and detects tire conditions of the tires 1, 2, 3, and 4 while a vehicle is being driven. The tire information output units 11, 12, 13, and 14 include respective sensors 11a, 12a, 13a, and 14a, that sense tire information of corresponding tires, and radio transmitters 11b, 12b, 13b, and 14b, that wirelessly transmit the tire information sensed by the sensors 11a, 12a, 13a, and 14a, to the tire information detecting unit 21. The tire information detecting unit 21 includes radio receivers 21a, 21b, 21c, and 21d, corresponding to the radio transmitters 11b, 12b, 13b, and 14b, each of which independently receives tire information from the radio transmitters 11b, 12b, 13b, or 14b, and then performs wave reshaping of the information. The tire information detecting unit 21 also includes a computing unit 21e that controls the overall system and detects tire conditions from the tire information.

Additionally, the tire information may include tire pressure, speed of tire rotation, tire eccentric with respect to an axle, wear rate, and other various types of information in terms of tire condition identified by a tire number. The tire information output units 11, 12, 13, and 14 wirelessly transmit such tire information to the tire information detecting unit 21 at predetermined intervals, for example, at one minute intervals.

The appropriate sensors 11a, 12a, 13a, and 14a are employed depending on a type of the object to be sensed.

With reference to FIG. 2, the radio receivers 21a, 21b, 21c, and 21d receive electric power from the computing unit 21e, and transmit tire information after waveform shaping thereof and RSSI to the computing unit 21e.

The computing unit 21e does not process all the tire information signals transmitted from the tire information output units 11, 12, 13, and 14; every time it normally finishes a reception process of one of the tire information signals, it assigns priorities to all the tire information signals so as to assign the lowest priority to the normally processed tire information signal. If a plurality of the tire information signals are transmitted from the plurality of tire information output units while the computing unit 21e is ready for reception, the computing unit 21e processes one of the tire information signals having the highest priority and discards reception processes for the other tire information signals.

For example, with reference to FIG. 3, after system startup, the radio receivers 21a, 21b, 21c, and 21d sequentially delivers tire information to the computing unit 21e as follows: tire information A from the radio receiver 21a, tire information C from the radio receiver 21c, tire information B from the radio receiver 21b, tire information A from the radio receiver 21a, tire information D from the radio receiver 21d, tire information C from the radio receiver 21c, and tire information B from the radio receiver 21b. With reference to FIG. 4, at the system startup, priorities of tire information A to D are not determined. The computing unit 21e processes one of the tire information signals from the radio receivers 21a, 21b, 21c, and 21d on first-come basis. In FIG. 3, the tire information A from the radio receiver 21a is first delivered to the computing unit 21e. The computing unit 21e processes the tire information A. After the computing unit 21e normally processes the tire information A, it assigns the lowest priority, namely, the fourth priority to the tire information A, and assigns higher priorities to the tire information B, C, D than that of the tire information A.

Subsequently, the tire information C is transmitted to the computing unit 21e from the radio receiver 21c. The computing unit 21e processes the tire information C. After the computing unit 21e normally processes the tire information C, it assigns the lowest priority to the tire information C, the third priority to the tire information A, and higher priorities to the tire information B, D than those of the tire information A and C.

Subsequently, the tire information B is transmitted from the radio receiver 21b to the computing unit 21e. The computing unit 21e processes the tire information B. After the computing unit 21e normally processes the tire information B, it assigns the lowest priority to the tire information B, the third priority to the tire information C, the second priority to the tire information A, and the first priority to the tire information D.

Subsequently, the tire information A is transmitted from the radio receiver 21a to the computing unit 21e. The computing unit 21e processes the tire information A. During the process, the tire information D is transmitted from the radio receiver 21d to the computing unit 21e. Since the priority of the tire information D is higher than that of the tire information A, the computing unit 21e stops processing the tire information A and starts to process the tire information D. After the computing unit 21e normally processes the tire information D, it assigns the lowest priority to the tire information D, the third priority to the tire information B, the second priority to the tire information C, and the first priority to the tire information A.

Subsequently, the tire information C is transmitted from the radio receiver 21c to the computing unit 21e. The computing unit 21e processes the tire information C. During the process, the tire information B is transmitted from the radio receiver 21b to the computing unit 21e. Since the priority of the tire information C is higher than that of the tire information B, the computing unit 21e does not process the tire information B and continues to process the tire information C. After the computing unit 21e normally processes the tire information C, it assigns the lowest priority to the tire information C, the third priority to the tire information D, the second priority to the tire information B, and the first priority to the tire information A.

In order to discard the processes for tire information having lower priorities when the plurality of pieces of tire information A, B, C, and D are transmitted from the plurality of radio receivers 21a, 21b, 21c, and 21d while the computing unit 21e is ready for reception, an external interrupt of tire information to the computing unit 21e may be inhibited. Alternatively, the computing unit 21e may command to shut off supply of the electric power for radio receivers which receive tire information having lower priorities. In the first case, a program stored in the computing unit 21e can both execute the reception processes of the tire information A, B, C, and D, and inhibit external interrupts, so that desired processes can be performed in a short time and reliability of the tire information detecting system is increased. In the second case, delivery of tire information having lower priorities from the radio receivers 21a, 21b, 21c, and 21d to the computing unit 21e can be temporarily stopped, so that executing the number of processes of signals in the computing unit 21e can be further reduced and therefore the cost of the tire information detecting system can be further reduced.

In the tire information detecting system according to this embodiment, when the plurality of tire information output units 11, 12, 13, and 14 transmit a plurality of the tire information signals A, B, C, and D while the tire information detecting unit 21 is ready for reception, one of the tire information signals having higher priority is processed and the other tire information signals are discarded. Consequently, as shown in FIG. 5, the number of reception processes performed in the tire information detecting unit 21 can be reduced and therefore intervals between the reception processes can be increased. As a result, the load of the tire information detecting unit 21, which is composed of a microcomputer, can be reduced and therefore a low-cost, low-performance microcomputer can be used for the tire information detecting unit 21. This reduces the total cost of the tire information detecting system.

Additionally, in the tire information detecting system according to this embodiment, the tire information output units 11, 12, 13, and 14 have respective radio transmitters 11b, 12b, 13b, and 14b, and the tire information detecting unit 21 has the radio receivers 21a, 21b, 21c, and 21d. Since the tire information output units 11, 12, 13, and 14 transmit tire information signals to the tire information detecting unit 21 via radio waves, wires between the tire information output units 11, 12, 13, and 14, and the tire information detecting unit 21 are not required. Accordingly, the tire information detecting system can be easily assembled into the vehicle body. In addition, breaking of the wires during use does not occur, thus enhancing durability and reliability of the tire information detecting system.

Additionally, in the tire information detecting system according to this embodiment, the priorities of tire information A, B, C, and D are determined by assigning a higher priority to a tire information signal having a longer elapsed time after the previous normal process of the tire information signal. Accordingly, the tire information A, B, C, and D are processed nearly evenly. As a result, the tire information detecting system can reliably detect the tire information.

Additionally, in the tire information detecting system according to this embodiment, although the priorities of tire information A, B, C, and D are not determined at system startup time, this is not disadvantageous for the following reason: Signals output from the tire information output units 11, 12, 13, and 14 are not synchronized at all, and therefore, at system startup time, the output timings of signals from the tire information output units 11, 12, 13, and 14 are normally different. A plurality of the tire information signals are not virtually received by the tire information detecting unit at the same time. Accordingly, the tire information detecting unit 21 need not set priorities to the tire information during the whole time period from system startup to system shutdown.

In the above-described embodiment, only the tire information A, B, C, and D output from the sensors 11a, 12a, 13a, and 14a are transmitted to the computing unit 21e via the radio transmitters 11b, 12b, 13b, and 14b and the radio receivers 21a, 21b, 21c, and 21d. In reality, although the radio receivers 21a, 21b, 21c, and 21d do not receive any signals from the radio transmitters 11b, 12b, 13b, and 14b, some wave signals are sometimes output from the radio receivers 21a, 21b, 21c, and 21d to the computing unit 21e. If the computing unit 21e receives these incorrect signals, the load of the computing unit 21e increases, thereby impairing the normal reception processes of the tire information.

Figure 6:
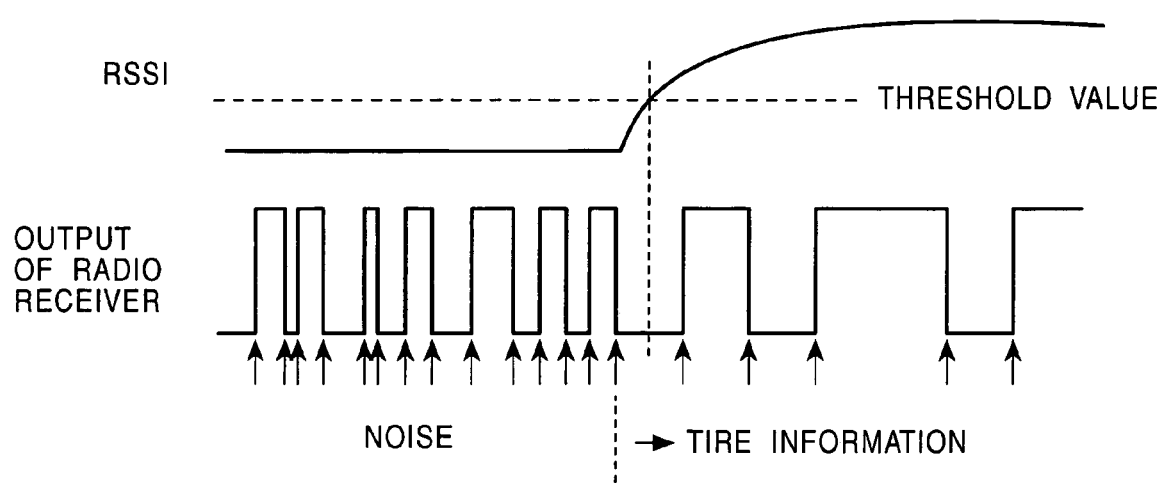
FIG. 6 is a diagram for explaining a method for retrieving the tire information by the tire information detecting system according to the embodiment.

To solve this problem, as well as receiving signals from the radio receivers 21a, 21b, 21c, and 21d on a predetermined priority basis as in the above-described embodiment, the computing unit 21e may monitor RSSI levels output from the radio receivers 21a, 21b, 21c, and 21d, and may start to receive the tire information A, B, C, and D after the RSSI levels reach a predetermined value, as shown in FIG. 6.

That is, since the RSSIs are output in accordance with the intensities of reception signals in the radio receivers 21a, 21b, 21c, and 21d, wave signals transmitted from the radio receivers 21a, 21b, 21c, and 21d to the computing unit 21e are determined to be noise while the RSSIs are in a low level, and wave signals transmitted from the radio receivers 21a, 21b, 21c, and 21d to the computing unit 21e are determined to be desired tire information while the RSSIs are in a high level. Accordingly, if, as shown in FIG. 6, a suitable threshold value of the RSSI is selected and wave signals transmitted from the radio receivers 21a, 21b, 21c, and 21d to the computing unit 21e are processed while the RSSIs exceeding the threshold value are output, useless reception processes of the computing unit 21e can be eliminated or reduced. This reduces the load of the computing unit 21e.

Additionally, in the above-described embodiment, the priorities of the tire information A to D are not preset at system startup time, and are set after one of the tire information signals is received and processed normally. However, the present invention is not limited thereto. For example, the priorities of the tire information A to D at system startup time may be preset. This configuration provides substantially the same advantages as those of the tire information detecting system according to the above-described embodiment.

What is claimed is:

1. A tire information detecting system comprising:
   a plurality of tire information output units, each separately detecting and outputting a tire information signal corresponding to each of a plurality of tires attached to axels; and
   a tire information detecting unit for detecting tire conditions of the tires based on the tire information signals transmitted from the tire information output units;
   wherein, every time the tire information detecting unit completes a reception process of one of the tire information signals, the tire information detecting unit changes priority in the tire information so as to assign a lowest priority to the processed tire information signal, and, when the plurality of tire information output units transmit a plurality of the tire information signals while the tire information detecting unit is ready for reception, the tire information detecting unit processes one of the tire information signals having a highest priority and discards processes of the other tire information signals having lower priorities.

2. The tire information detecting system according to claim 1, wherein each of the tire information output units comprises a sensor for sensing the tire information and a radio transmitter for wirelessly transmitting the tire information sensed by the sensor to the tire information detecting unit, and the tire information detecting unit comprises radio receivers for receiving and reshaping the tire information signals wirelessly transmitted from the radio transmitters and a computing unit for controlling the overall tire information detecting system and for detecting conditions of the tires.

3. The tire information detecting system according to claim 2, wherein, when the plurality of tire information output units transmit a plurality of the tire information signals while the tire information detecting unit is ready for reception, the tire information detecting unit discards reception processes of the other tire information signals by inhibiting external interrupts of the other tire information signals having lower priorities to the computing unit.

4. The tire information detecting system according to claim 2, wherein, when the plurality of tire information output units transmit a plurality of the tire information signals while the tire information detecting unit is ready for reception, the tire information detecting unit discards reception processes of the other tire information signals by shutting off electric power for the radio receivers for receiving the tire information signals having lower priorities.

5. The tire information detecting system according to claim 1, wherein, when the tire information detecting unit receives a plurality of the tire information signals while the tire information detecting unit is ready for reception, the tire information detecting unit assigns a higher priority to one of the tire information signals having a longer elapsed time after the previous normal process of the tire information signal.

6. The tire information detecting system according to claim 1, wherein the information detecting unit does not assign priorities to the tire information signals at system startup time and assigns the priorities after processing one of the tire information signals normally.

7. The tire information detecting system according to claim 2, wherein the information detecting unit monitors RSSI levels output from the radio receivers and performs the reception processes of the signals output from the radio receivers as the tire information after the RSSI levels exceed a predetermined threshold value.

* * * * *